United States Patent [19]

Kanazawa

[11] Patent Number: 4,522,279
[45] Date of Patent: Jun. 11, 1985

[54] STEERING DEVICE FOR A VEHICLE

[75] Inventor: Hirotaka Kanazawa, Hiroshima, Japan

[73] Assignee: Mazda Motor Corporation, Japan

[21] Appl. No.: 477,635

[22] Filed: Mar. 21, 1983

[30] Foreign Application Priority Data

| Mar. 24, 1982 | [JP] | Japan | 57-47848 |
| Apr. 21, 1982 | [JP] | Japan | 57-67879 |
| Jul. 20, 1982 | [JP] | Japan | 57-127136 |
| Jul. 20, 1982 | [JP] | Japan | 57-127137 |
| Jul. 31, 1982 | [JP] | Japan | 57-134320 |

[51] Int. Cl.³ ............................................. B62D 1/20
[52] U.S. Cl. ..................................... 180/143; 74/470; 180/148; 267/150; 464/112
[58] Field of Search ............... 180/132, 148, 141, 143; 267/150; 74/470; 464/62, 81, 112

[56] References Cited

U.S. PATENT DOCUMENTS

| 1,711,187 | 4/1929 | Triulzi | 464/112 |
| 3,528,265 | 9/1970 | Brinson | 464/62 |
| 3,839,883 | 10/1974 | Braess | 74/470 |

FOREIGN PATENT DOCUMENTS

| 53-10731 | 4/1978 | Japan. | |
| 259547 | 6/1949 | Switzerland | 464/62 |

Primary Examiner—Joseph F. Peters, Jr.
Assistant Examiner—Kenneth R. Rice
Attorney, Agent, or Firm—Murray, Whisenhunt & Ferguson

[57] ABSTRACT

A steering device for a vehicle comprises a steering wheel operatively connected to dirigible wheels of the vehicle by way of a steering linkage so that the dirigible wheels are turned in response to rotation of the steering wheel. A portion of the steering linkage which is rotted with the steering wheel is divided into first and second parts and the first and second parts are connected with each other by way of a pair of coil springs and a damper. The coil springs are adapted to be elastically deformed to produce a rotational displacement between the first and second parts upon rotation of the steering wheel while the damper is adapted to damp the steering force of the steering wheel. An adjustment means is provided for changing the damping characteristics of the damper according to speed of the vehicle and/or the steering torque of the steering wheel.

9 Claims, 9 Drawing Figures

F I G. 3
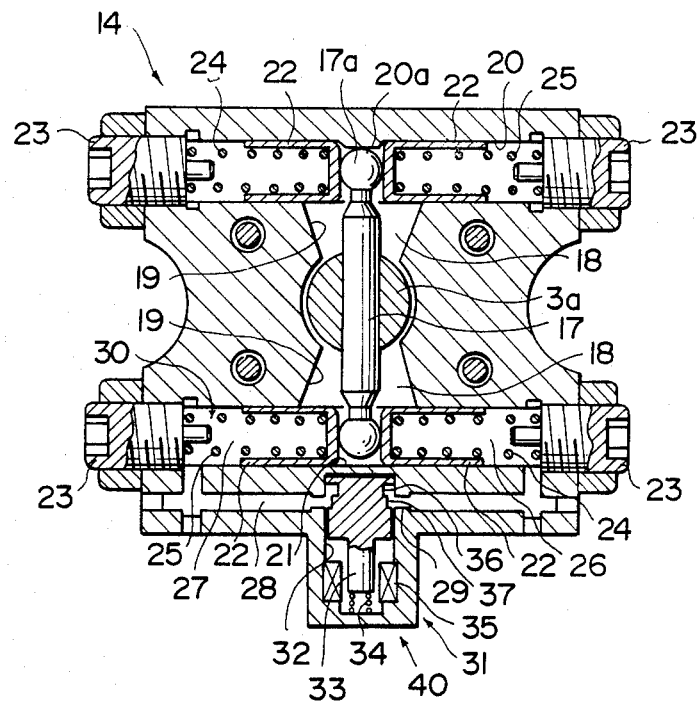
F I G. 4
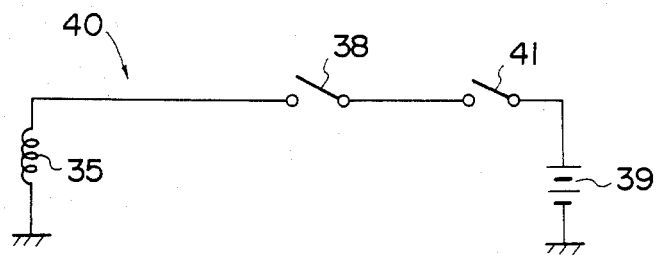

STEERING DEVICE FOR A VEHICLE

BACKGROUND OF THE INVENTION

1. Field of the Invention

This invention relates to a steering device for a vehicle, and more particularly to a steering device in which the steering ratio, the ratio of the rotating angle of the steering wheel to the angle by which the dirigible wheels are turned as a result of the rotation of the steering wheel by the rotating angle, is variable in response to the rotating speed of the steering wheel.

2. Description of the Prior Art

Generally, the dirigible wheels of a vehicle are operatively connected with the steering wheel by way of a steering linkage to be turned in response to rotation of the steering wheel. The steering angle of the dirigible wheels, i.e., the angle by which the dirigible wheels are turned, solely depends upon the rotating angle of the steering wheel and is independent of the rotating speed of the steering wheel.

In case of emergency (for example when clearing an obstruction in the road), it is preferred that the steering ratio be small so that the dirigible wheels can be turned through a large angle by rotation of the steering wheel through a small angle thereby obtaining a quick response of the dirigible wheels to the steering operation. In order to meet such a requirement, there has been proposed in Japanese Patent Publication 53(1978)-10731 a steering device in which the steering ratio is variable in response to the rotating speed of the steering wheel so that the steering ratio is decreased when the steering wheel is rotated at a high speed or quickly as in the case of emergency. This steering device utilizes viscosity or an electromagnetic coupling to make the steering ratio variable in response to the rotating speed of the steering wheel.

However, the variable steering ratio of the steering device proposed in the Japanese Patent Publication is independent of the speed of the vehicle and the steering torque of the steering wheel. Therefore, if the steering wheel is operated when the vehicle speed is high in such a manner as when the vehicle speed is low, the vehicle will make a dangerous sharp turn. Further, when the steering wheel is rotated with a large torque as is the case when the steering wheel is operated with the vehicle being at rest, a damping effect responsive to the steering torque cannot be obtained to give a bad feeling to the driver in the steering operation.

SUMMARY OF THE INVENTION

In view of the foregoing observations and description, the primary object of the present invention is to provide a steering device for a vehicle in which the steering ratio is variable in response to the rotating speed of the steering wheel and at the same time the variable steering ratio characteristics can be changed according to the speed of the vehicle and the steering torque, thereby improving the steering stability during a high speed travel of the vehicle and the feeling in steering operation.

Another object of the present invention is to accomplish the above object without complicating the structure of the steering device.

In accordance with the present invention, a rotating portion of the steering linkage which is rotated to transmit the steering force of the steering wheel to the dirigible wheels is divided into two parts, and the two parts is connected with each other by way of a resilient member and a damper the damping effect of which is variable. The resilient member is adapted to produce a rotational displacement between the two parts, and the damper serves to change transmission of the steering force in response to the rotating speed of the steering wheel. The steering device of the present invention is further provided with an adjustment means for changing the damping characteristics or the transmission characteristics of the damper.

BRIEF DESCRIPTION OF THE DRAWINGS

FIG. 3 is a cross sectional view taken along line III—III in FIG. 2, FIG. 4 is a circuit diagram of a circuitry for actuating the solenoid employed in the steering device.

DESCRIPTION OF THE PREFERRED EMBODIMENT

Figure 1:
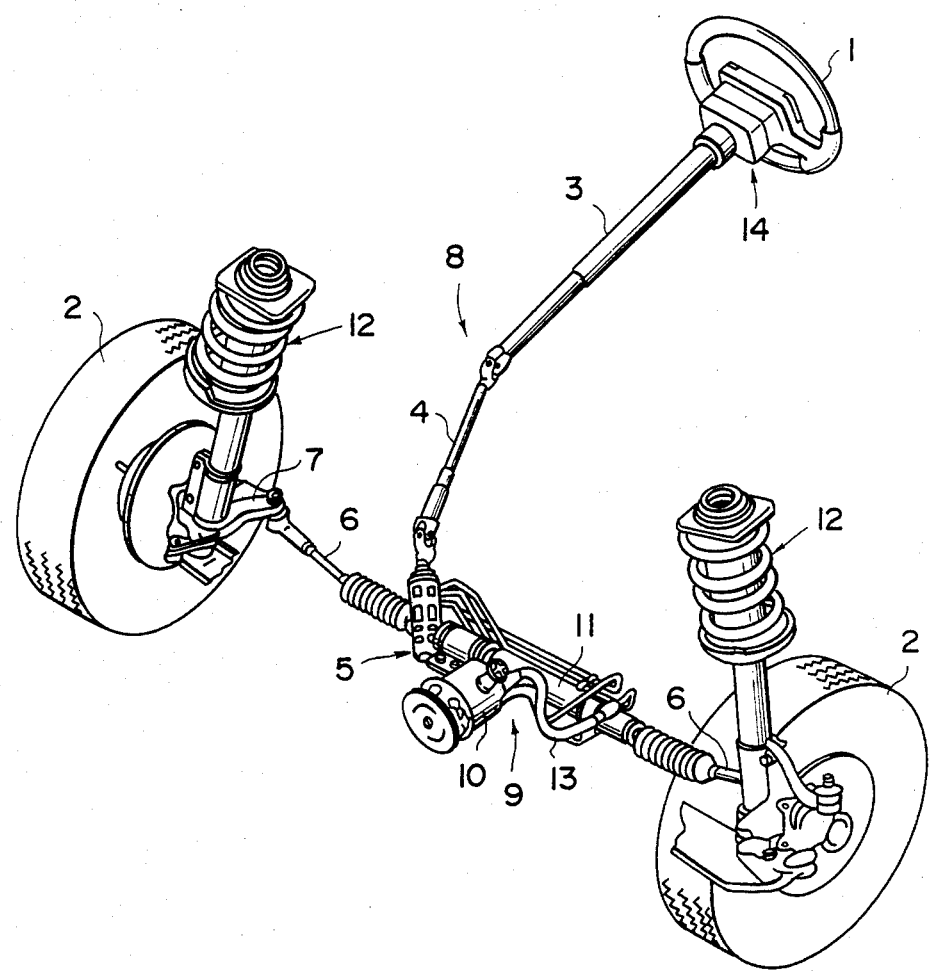
FIG. 1 is a perspective view showing a steering device in accordance with an embodiment of the present invention.

In FIG. 1 which shows a first embodiment of the present invention in which the steering characteristics are variable according to the vehicle speed, a steering wheel 1 is operatively connected with right and left front wheels 2 by way of a steering linkage 8. The steering linkage 8 comprises an upper steering shaft 3 connected to the steering wheel 1 at the upper end thereof, a lower steering shaft 4 connected to the lower end of the upper steering shaft 3 via a universal joint, a rack-and-pinion type steering gear 5 which converts the rotational movement of the upper steering shaft 3 transmitted thereto via the lower steering shaft 4 into a linear movement in the transverse direction of the car body, the steering gear 5 being connected to the lower end of the lower steering shaft 4, and a pair of (right and left) tie rods 6 which are connected to the right and left ends of the steering gear 5, respectively. The right and left tie rods 6 are further connected to right and left steering knuckles 7 supporting the front wheels 2. A power assisting device (hereinbelow referred to simply as "power assist") 9 is associated with the rack of the steering gear 5. The power assist 9 comprises an oil pump 10 which is driven by the engine (not shown) of the vehicle to generate oil pressure, and a cylinder 11 driven by the oil pressure from the oil pump 10 when the steering action of the steering wheel 1 is detected. The operation of the power assist 9 and the operation of the steering linkage 8, except for that of the upper steering shaft 3, are substantially the same as those of the corresponding parts of the conventional power steering device and therefore will not be described in detail here.

Reference numerals 12 and 13 in FIG. 1 indicate suspensions for the right and left front wheels 2 and an oil pipe for the oil pump 10, respectively.

Figure 2:
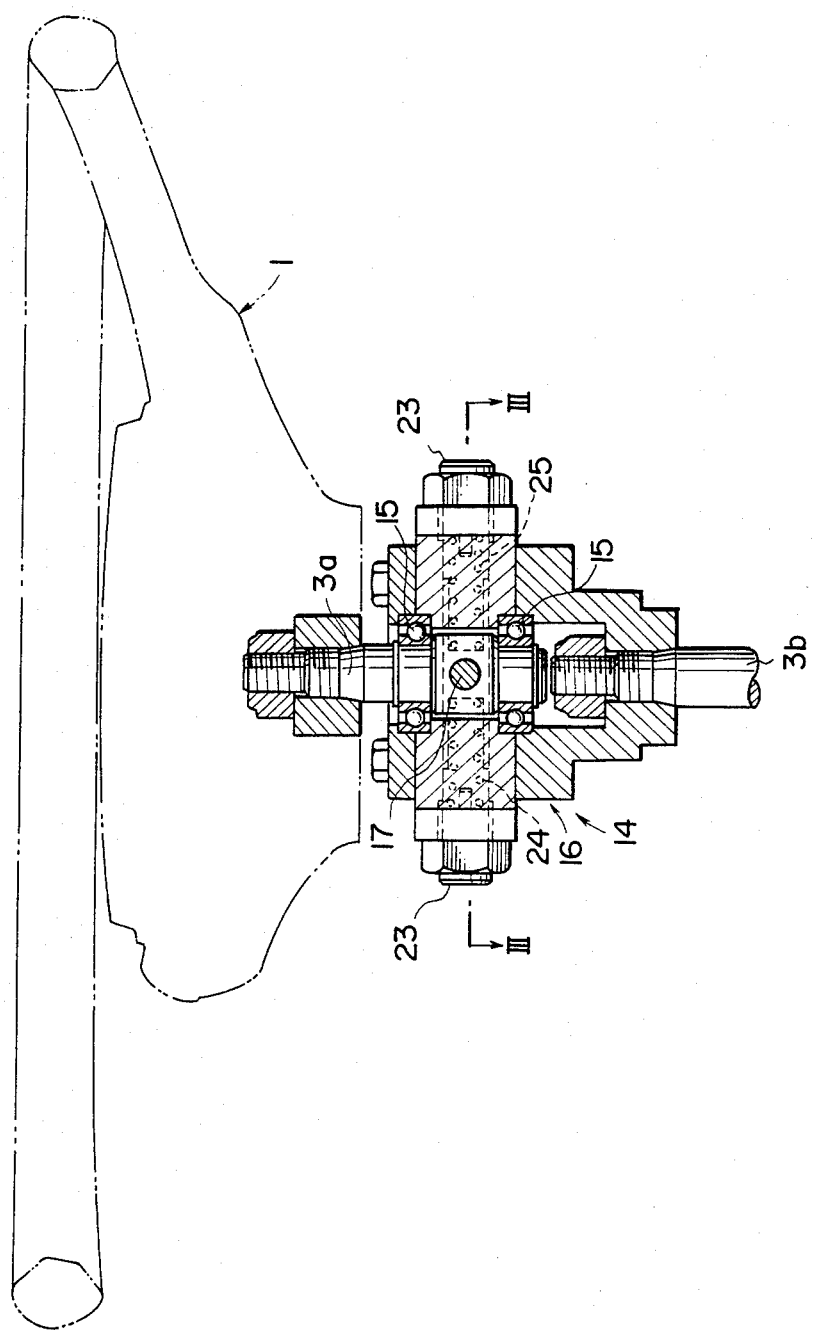
FIG. 2 is an enlarged cross sectional view of a coupling employed in the steering device of FIG. 1.

The upper steering shaft 3 is divided into upper and lower parts 3a and 3b which are connected with each other by means of a coupling 14 as shown in FIG. 2. The structure of the coupling 14 is shown in detail in FIGS. 2 and 3. The upper end portion of the upper part 3a is fixedly connected to the steering wheel 1 to rotate therewith and the lower end portion of the upper part 3a is rotatably supported by a pair of bearings 15 mounted on a coupling body 16. A bore is formed in the lower end portion of the upper part 3a between the bearings 15 to extend perpendicular to the longitudinal axis or the rotational axis of the upper steering shaft 3. An engaging pin 17 is snugly received in the bore so that opposite end portions of the pin 17 project from the bore perpendicularly to the rotational axis of the upper steering shaft 3 as clearly shown in FIG. 3. The engaging pin 17 is provided with a pair of spherical heads 17a at the respective ends thereof. The upper end portion of the lower part 3b of the upper steering shaft 3 is fixedly connected to the lower portion of the coupling body 16 to rotate with the coupling body 16. The coupling body 16 is further provided at an intermediate portion thereof with a pair of sector cutaway portions 18 through which the end portions of the engaging pin 17 extend. The side walls of the cutaway portions 18 form stopper shoulders 19 which limit rotary movement of the pin 17 within a predetermined angle determined by the included angle of the sector cutaway portions 18 in order to prevent breakage of the coupling 14 when the steering torque is large, for example, when the steering wheel 1 is rotated with the vehicle being at rest or an excessive load is exerted onto the front wheels 2. The coupling body 16 is further provided with first and second spring receiving bores 20 and 21 which extend in parallel to each other and each of which extends substantially in the direction of the tangential movement of the spherical heads 17a of the engaging pin 17. An adjustment screw 23 is screwed into each end of the spring receiving bores 20 and 21. A pair of opposed collars 22 are slidably inserted into each of the spring receiving bores 20 and 21 in a liquid tight fashion and abut against the spherical head 17a of the engaging pin 17 on opposite sides thereof. The collars 22 respectively inserted into the left side (in FIG. 3) of the first spring receiving bore 20 and the right side of the second spring receiving bore 21 are urged toward the spherical heads 17a on opposite ends of the pin 17 by first coil springs 24. The collars 22 respectively inserted into the right side of the first spring receiving bore 20 and the left side of the second spring receiving bore 21 are urged toward the respective spherical heads 17a by second coil springs 25. That is, the first coil springs 24 are adapted to be elastically deformed to accumulate a returning force pushed by the respective spherical heads 17a when the engaging pin 17 is rotated in the counterclockwise direction in FIG. 3, while the second coil springs 25 are adapted to be elastically deformed to accumulate a returning force pushed by the respective spherical heads 17a when the engaging pin 17 is rotated in the clockwise direction in FIG. 3. As can be seen from the description above, the four coil springs 24 and 25 are positioned so that their longitudinal axes are in a plane substantially perpendicular to the upper steering shaft 3 and extend substantially in the direction of the tangential movement of the heads 17a. Thus, the upper and lower parts 3a and 3b of the upper steering shaft 3 are operatively connected with each other via two pairs of coil springs 24 and 25, the first coil springs 24 and the second coil springs 25 being adapted to be elastically deformed by rotation of the upper part 3a in opposite directions.

On the inner surface of the first spring receiving bore 20, is integrally formed a stopper projection 20a opposed to the head 17a of the engaging pin 17. The stopper projection 20a abuts against the inner ends of the collars 22 in the first spring receiving bore 20 to limit the inward movement of the collars 22 thereby limiting extension of the coil springs 24 and 25 urging the collars 22. The stopper projection 20a constitutes restricting means which associates with the adjustment screws 23 to compress the coil springs 24 and 25 with a predetermined pressure therebetween, thereby applying a predetermined set load to the coil springs 24 and 25. By applying a set load to the coil springs 24 and 25, the free play due to the flection of the coil springs 24 and 25 can be limited, whereby the insensitive region near the center of the steering range can be limited.

The spaces between the collars 22 and the adjustment screws 23 in the second spring receiving bore 21 form first and second damper chamber 26 and 27, respectively. The first and second damper chambers 26 and 27 are connected with each other by way of a communicating passageway 28 formed in the coupling body 16. An orifice 29 is formed in the passageway 28 at an intermediate portion thereof. The first and second damper chambers 26 and 27 and the communicating passageway 28 are filled with oil. When the collars 22 are moved in the second spring receiving bore 21 and the volume of the damper chambers 26 and 27 is changed, the oil is moved from one chamber to the other. A so-called oil damper 30 is thus formed. The damper 30 changes the transmission of the rotating force of the heads 17a according to the rotating speed of the heads 17a by virtue of the retarding effect of the orifice 29 so that the transmission of steering force to the lower part 3b of the upper steering shaft 3 is increased with the increase of the rotating speed of the steering wheel 1. Thus the upper and lower parts 3a and 3b of the upper steering shaft 3 are connected with each other by way of the oil damper 30 and said two pairs of coil springs 24 and 25.

Said orifice 29 of the communicating passageway 28 is provided with an electromagnetic flow control valve 31 which changes the effective cross sectional area of the orifice 29. The flow control valve 31 comprises a cylindrical valve chamber 32 formed in the coupling body 16 to extend substantially perpendicular to the orifice 29, a spool 31 fit into the valve chamber 33 to be slidable perpendicular to the orifice 29, a spring 34 which urges the spool 33 upwardly (as seen in FIG. 3), and a solenoid 35 which attracts the spool 33 downwardly overcoming the force of the spring 34 when energized. The spool 33 is provided with first and second annular grooves 36 and 37 formed on the peripheral surface thereof. The first annular groove 36 is deeper than the second annular groove 37 and the grooves 36 and 37 are selectively opposed to the orifice 29 to provide the oil in the damper 30 with flow passageways of different cross sectional areas when the first annular groove 36 is opposed to the orifice 29, a flow passageway of a larger cross sectional area is provided. The solenoid 35 is connected to the battery 39 through a vehicle speed sensitive switch 38 and a switch 41 actuated by the ignition key (not shown) as shown in FIG. 4. The vehicle speed sensitive switch 38 is closed when the vehicle speed is not lower than a predetermined value to energize the solenoid 35. When energized, the solenoid 35 attracts the spool 33 overcoming the resilient force of the spring 34 to oppose the first annular groove 36 to the orifice 29, whereby the effective diameter of the orifice 29 is enlarged. On the other hand, when the vehicle speed is lower than the predetermined value, the vehicle speed sensitive switch 38 is kept open and therefore the solenoid 35 is not energized. Thus the spool 33 is held under the force of the spring 34 in the upper position in which the second annular groove 37 is opposed to the orifice 29 to make small the effective diameter of the orifice 29. An adjustment means 40 for changing the transmission characteristics of the damper 30 in response to the vehicle speed is thus formed.

When the steering wheel 1 is rotated while the vehicle is running at a certain speed, the engaging pin 17 is rotated with the upper part 3a of the upper steering shaft 3 in a plane substantially perpendicular to the upper part 3a overcoming the urging force of the coil springs 24 or 25. The rotating force of the engaging pin 17, i.e., the steering force of the steering wheel 1, is transmitted to the coupling body 16 and the lower part 3b of the upper steering shaft 3 by way of the damper 30, whereby the lower part 3b is rotated. The rotation of the lower part 3b of the upper steering shaft 3 is transmitted to the steering gear 5 through the lower steering shaft 4 and then converted into linear movement in a transverse direction of the vehicle body. The linear movement is transmitted to the front wheels 2 to turn them with the assistance of the power assist 9.

The steering force of the steering wheel 1 is transmitted to the lower part 3b of the upper steering shaft 3 in response to the rotating speed of the steering wheel 1 by virtue of the retarding effect of the orifice 29 of the damper 30. Accordingly the steering ratio is changed in response to the rotating speed of the steering wheel 1 to be increased when the rotating speed of the steering wheel 1 is low and to be reduced when the rotating speed of the steering wheel 1 is high. Therefore, when the steering wheel 1 is quickly rotated in case of emergency, for example, to clear an obstruction in the road, the steering ratio is small and the front wheels 2 are turned through a large angle for a small rotating angle of the steering wheel 1 to obtain a quick steering response. During the normal steering operation in which the steering wheel 1 is relatively slowly rotated, the steering ratio is relatively large and accordingly the response of the front wheels 2 to the rotation of the steering wheel 1 is relatively slow, whereby the steering stability is ensured. The characteristics of the variable steering ratio are changed in two steps by changing the transmission characteristics of the damper 30 according to the vehicle speed. That is, when the vehicle is running at a low speed lower than a predetermined value, the second annular groove 37 of the spool 33 which is shallower than the first annular groove 36 is opposed to the orifice 29 to make small the effective diameter thereof, thereby increasing the retarding effect of the orifice 29 to produce the steering ratio characteristics shown by the line (a) in FIG. 5. On the other hand, when the vehicle is running at a high speed not lower than the predetermined value, the solenoid 35 is energized to oppose the first annular groove 36 to the orifice 29 so that the effective diameter of the orifice 29 is enlarged to reduce the retarding effect of the orifice, thereby producing the steering ratio characteristics shown by the line (b) in FIG. 5. As can be seen from FIG. 5, the steering ratio during a high speed travel of the vehicle is larger than that during a low speed travel over the entire range of the steering rotating speed. A quick steering response of the front wheels is thus obtained to ensure the good steering during the low speed travel while the steering response of the front wheels is slightly slowed down to improve the steering stability during the high speed travel. The variable steering ratio steering device of this embodiment is simple in its structure and can easily and economically be manufactured since its steering ratio is made variable by the coil springs 24 and 25 and the damper 30 inserted into the linkage 8.

Figure 5:
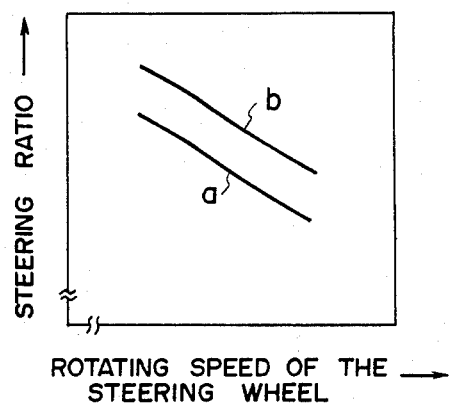
FIG. 5 is a graph showing the steering ratio characteristics obtained by the steering device.

Said vehicle speed sensitive switch may be a manually operable switch so that the driver can select either of the veriable steering ratio characteristics shown by the lines (a) and (b) in FIG. 5 according to his choice and/or his driving technique.

Figure 6:
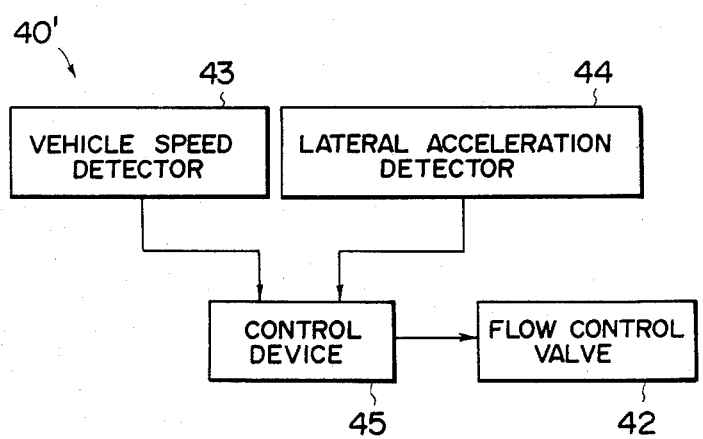
FIG. 6 is a block diagram illustrating a modification of the steering device shown in FIGS. 1 to 3.

FIG. 6 is a block diagram illustrating another embodiment of the present invention in which the transmission characteristics of the damper are continuously changed in response to the vehicle speed and the lateral acceleration of the vehicle by means of an adjustment means 40'. The adjustment means 40' comprises a flow control valve 42 which is adapted to continuously change the effective diameter of the orifice, a vehicle speed detector 43 for detecting the speed of the vehicle, a lateral acceleration detector 44 for detecting the acceleration of the vehicle in a direction transverse to the running direction thereof, and a control device 45 for driving the flow control valve 42 under the control of signals from the detectors 43 and 44. The flow control valve 42 changes the effective diameter of the orifice according to the output of the control device 45 so that the effective diameter of the orifice is continuously enlarged as the vehicle speed and the lateral acceleration of the vehicle increase. Thus in the case of this embodiment, the transmission characteristics of the damper are continuously changed with increase of the vehicle speed. Further in the case of this embodiment, better steering stability can be obtained since the transmission characteristics of the damper, i.e., the variable steering ratio characteristics, are changed according not only to the vehicle speed but also to the lateral acceleration of the vehicle, whereby a steering stabilizing performance according to the running condition of the vehicle can be obtained. The lateral acceleration detector 44 may directly detect the lateral acceleration of the vehicle or determine an approximate value of the lateral acceleration through a calculation based on the vehicle speed and the rotating angle or rotating speed of the steering wheel which may be detected by any suitable means.

Figure 7:
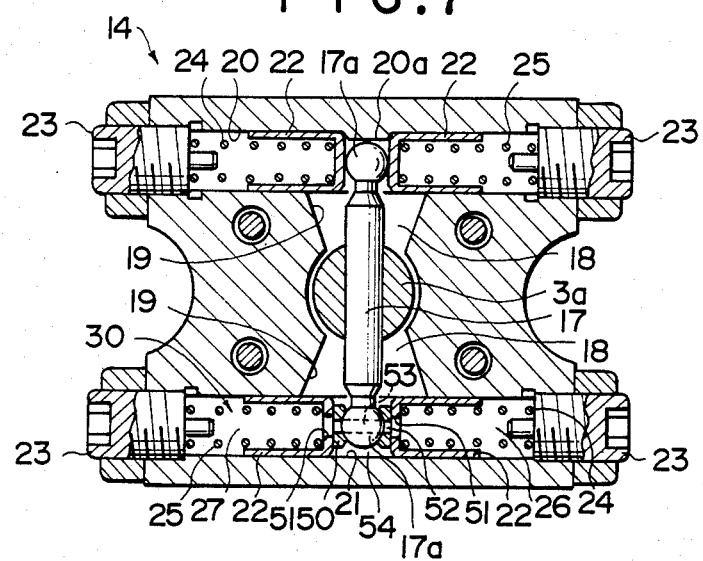
FIG. 7 is a cross sectional view similar to FIG. 3 showing a coupling employed in another embodiment of the present invention.

Now another embodiment of the present invention in which the variable steering ratio characteristics are changed in response to the steering torque of the steering wheel will be described referring to FIGS. 7 to 9. FIG. 7 shows a coupling which is employed in the steering device of this embodiment. The coupling is substantially the same as the coupling 14 illustrated in FIGS. 2 and 3 except that the communicating passageway is formed through the spherical head of the engaging pin. Therefore, analogous parts are given like reference numerals as in FIGS. 2 and 3. In FIG. 7, the first and second damper chambers 26 and 27 are filled with oil to form the oil damper 30. The collars 22 which form the damper chambers 26 and 27 cooperating with the adjustment screws 23 are urged against the spherical head 17a of the engaging pin 17 on opposite sides thereof. An annular seal member 50 is sandwiched between the head 17a and each collar 22. Each seal member 50 abuts against the spherical head 17a at the inner end thereof having a spherical concave surface conforming to the spherical surface of the head 17a and abuts against the flat inner end surface of the collar 22 at the outer end thereof having a flat surface. A diametrical bore 53 is formed through the heads 17a. The diametrical bore 53 has a diameter equal to the diameter of an opening 52 of the seal members 50, and is aligned with the openings 52 of the respective seal member 50 when the engaging pin 17 is positioned perpendicularly to the second spring receiving bore 21, i.e. when no steering torque is exerted onto the steering wheel 1 and no rotational displacement is produced between the upper and lower parts 3a and 3b of the upper steering shaft 3. The opening 52 of each seal member 50 is opposed to an opening 51 formed in the inner end surface of the corresponding collar 22. Thus, a communicating passageway 54 is formed between the first and second damper chambers 26 and 27 by the openings 51 in the collars 50, the openings 52 of the seal members 50 and the diametrical bore 53 of the head 17a. Of course, the communicating passageway 54 is also filled with oil. The cross sectional area of the communicating passageway 54 is narrower than those of the first and second damper chambers 26 and 27. Accordingly, the damper 30 changes transmission of the steering force of the steering wheel 1 in response to the rotating speed of the same by virtue of the retarding effect of the communicating passageway 54.

The effective cross sectional area of the passageway 54 is reduced as the rotational displacement between the upper and lower parts 3a and 3b of the upper steering shaft 3. When no steering torque is exerted onto the steering wheel 1 and no rotational displacement is produced between the upper and lower parts 3a and 3b, the openings 51 in the inner end surfaces of the collars 22, the openings 52 of the seal members 50 and the diametrical bore 53 are aligned with each other on a straight line and accordingly the effective cross sectional area of the communicating passageway 54 is maximized. On the other hand, as the steering torque is increased and the engaging pin 17 approaches the stopper shoulders 19, the head 17a of the engaging pin 17 is rotated with respect to the seal member 50 and the centers of the openings 51 and 52 and the bore 53 are staggered from each other as shown in FIG. 9, whereby the effective cross sectional area of the communicating passageway 54 is gradually reduced. Thus, the damping effect characteristics of the damper 30 is changed in response to the steering torque.

It will be appreciated that the steering ratio can be changed in response to the rotating speed of the steering wheel 1 in this embodiment in a manner similar to that of the embodiment shown in FIGS. 1 to 3. At the same time, in the steering device of this embodiment, the damping effect of the damper 30 is reduced as the steering torque is increased as shown by the solid line (a) in FIG. 8. This is because the effective cross sectional area of the communicating passageway 54 is reduced as the steering torque is increased as described above. The chained line (b) in FIG. 8 shows the damping effect characteristics of the damper in the conventional steering device. Further, the reference character Ht represents the point at which the engaging pin 17 abuts against the stopper shoulders 19. As can be seen from FIG. 8, the damper 30 exhibits a large damping effect when the engaging pin 17 abuts against the stopper shoulders 19. Therefore, the counterforce from the stopper shoulders 19 does not act on the steering wheel 1 by way of the engaging pin 17 and the upper part 3a of the upper steering shaft 3 as an impact force on the steering wheel 1, which gives a driver a bad steering feeling.

Figure 8:
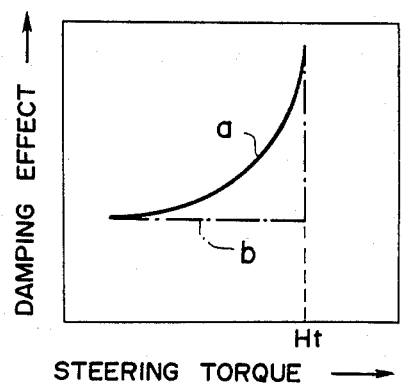
FIG. 8 is a graph showing a relation of the damping effect with the steering torque in the steering device shown in FIG. 7.
Figure 9:
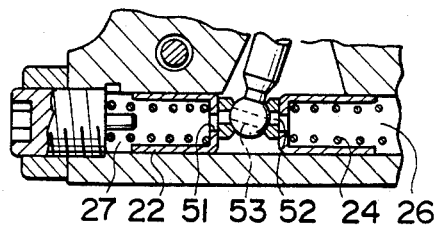
FIG. 9 is a fragmentary cross sectional view of the coupling shown in FIG. 7 in a condition different from FIG. 7.

Further, as the steering torque is related to the steering angle, the damping effect of the damper 30 is small during a high speed travel of the vehicle in which the steering wheel is generally rotated by a small angle (the steering torque is small) as can be seen from FIG. 8, whereby the steering ratio is increased during a high speed travel of the vehicle and the steering response of the front wheels 2 is made slow to obtain high steering stability.

Further the mechanism for changing the damping effect of the damper in response to the steering torque employed in this embodiment may be applied to the embodiment shown in FIGS. 1 to 3 so that the steering characteristics are made variable in response to both the vehicle speed and the steering torque.

Although the present invention is applied to a power steering device in the above embodiments, it will be apparent that the present invention may be applied to a steering device without a power assistance.

Further, said coupling 14 for changing the steering ratio in response to the rotating speed of the steering wheel 1 may be disposed in any part of the steering linkage so long as the part is rotated to transmit the steering force of the steering wheel. However, in the case of the power steering device the coupling should be disposed between the power assist and the steering wheel. A torsion bar or rubber may be used instead of the coil springs 24 and 25 as the resilient means to produce the rotational displacement.

Further, in the above embodiments, the damper 30 is mounted in the coupling 14 together with the coil springs 24 and 25. However, the damper 30 may be mounted independently of the coil springs 24 and 25. The damper 30 may be either of gas-filled type or liquid-filled type. In other words, the damper chambers 26 and 27 may be filled with a suitable gas instead of the oil.

I claim:

1. A steering device for a vehicle having a steering wheel operatively connected to dirigible wheels of the vehicle by way of a steering linkage so that the dirigible wheels are turned in response to rotation of the steering wheel wherein a rotating portion of the steering linkage which is rotated to transmit the steering force of the steering wheel upon rotation of the steering wheel is divided into first and second parts, and the first and second parts are connected by way of resilient means and a damper, the resilient means being adapted to be elastically deformed to produce a rotational displacement between the first and second parts of the rotating portion upon rotation of the steering wheel, said steering device having an adjustment means for changing the damping characteristics of said damper according to the speed of the vehicle.

2. A steering device as defined in claim 1 in which said damper comprises first and second damper chambers, and a communicating passageway connecting the first and second damper chambers which are filled with fluid, and said adjustment means changes the effective cross sectional area of the passageway.

3. A steering device as defined in claim 2 in which said adjustment means comprises an electromagnetic flow control valve disposed in said communicating passageway.

4. A steering device as defined in claim 3 in which said flow control valve enlarges the effective cross sectional area of said communicating passageway as the speed of the vehicle increases.

5. A steering device as defined in claim 4 in which said adjustment means further comprises a valve mechanism which reduces the effective cross sectional area of said passageway as said rotational displacement between said first and second parts of the rotating portion increases.

6. A steering device as defined in claim 5 in which said communicating passageway comprises a part fixed to one of the first and second parts of the rotating portion and a part fixed to the other of the first and second parts, whereby the effective cross sectional area of the passageway is reduced due to the rotational displacement between the two parts of the passageway produced by the rotational displacement between the first and second parts of the rotating portion.

7. A steering device as defined in claim 1, 2, 3 or 4 further comprises a restricting means wich applies a set load to said resilient means so that the resilient means can be elastically deformed only when the steering force of the steering wheel is larger than a predetermined value.

8. A steering device as defined in claim 1, 2, 3, 4, 5, or 6 in which said resilient means comprises at least a pair of coil springs which are adapted to be elastically deformed by rotation of the one of the two parts with respect to the other in opposite directions, said pair of coil springs being disposed so that the longitudinal axes thereof lie in a plane substantially perpendicular to the rotational axis of the rotating portion.

9. A steering device as defined in claim 1, 2, 3, 4, 5, or 6 further comprises a power assisting means provided at an intermediate portion of said linkage to assist the steering force of the steering wheel wherein said rotating portion is a portion of said linkage between the steering wheel and the power assisting means.

* * * * *